United States Patent [19]

Holbrook et al.

[11] Patent Number: 4,538,337
[45] Date of Patent: Sep. 3, 1985

[54] METHOD OF MECHANICALLY PRESTRESSING A TUBULAR APPARATUS

[75] Inventors: Richard L. Holbrook, Louisville; Dean L. Mayer, Alliance, both of Ohio

[73] Assignee: The Babcock & Wilcox Company, New Orleans, La.

[21] Appl. No.: 624,891

[22] Filed: Jun. 27, 1984

Related U.S. Application Data

[63] Continuation-in-part of Ser. No. 413,284, Aug. 31, 1982, Pat. No. 4,470,188.

[51] Int. Cl.³ .............................................. B23P 9/00
[52] U.S. Cl. ........................................ 29/445; 29/446; 29/455 R; 29/523; 138/148; 165/57
[58] Field of Search ................ 29/445, 446, 452, 520, 29/523; 138/148; 166/57

[56] References Cited

U.S. PATENT DOCUMENTS

| | | | |
|---|---|---|---|
| 2,289,401 | 7/1942 | Yost | 138/148 |
| 2,693,026 | 11/1954 | Simpelaar | 29/516 U X |
| 2,924,245 | 2/1960 | Wilson | 29/445 X |
| 3,156,042 | 11/1964 | Reed | 29/523 U X |
| 3,246,394 | 4/1966 | Meyer | 29/455 R X |
| 3,571,907 | 3/1971 | Watson | 29/523 X |
| 3,608,640 | 9/1971 | Wellhite | 166/57 X |
| 3,693,665 | 9/1972 | Veerling et al. | 29/446 X |
| 4,375,843 | 3/1983 | Itzinger | 29/446 X |

Primary Examiner—Charlie T. Moon
Attorney, Agent, or Firm—Robert J. Edwards; James C. Simmons

[57] ABSTRACT

A method of prestressing a tubular apparatus having coaxial inner and outer metal tubes which are connected to each other at axially spaced locations. After the inner and outer tubes are connected to each other so that the tubular apparatus may be heat-treated or otherwise processed before it is prestressed, the diameter of at least a portion of the inner tube is increased so that it is shortened to thereby establish a prestressed condition between the inner and outer tubes with the inner tube under tension and the outer tube under compression.

4 Claims, 3 Drawing Figures

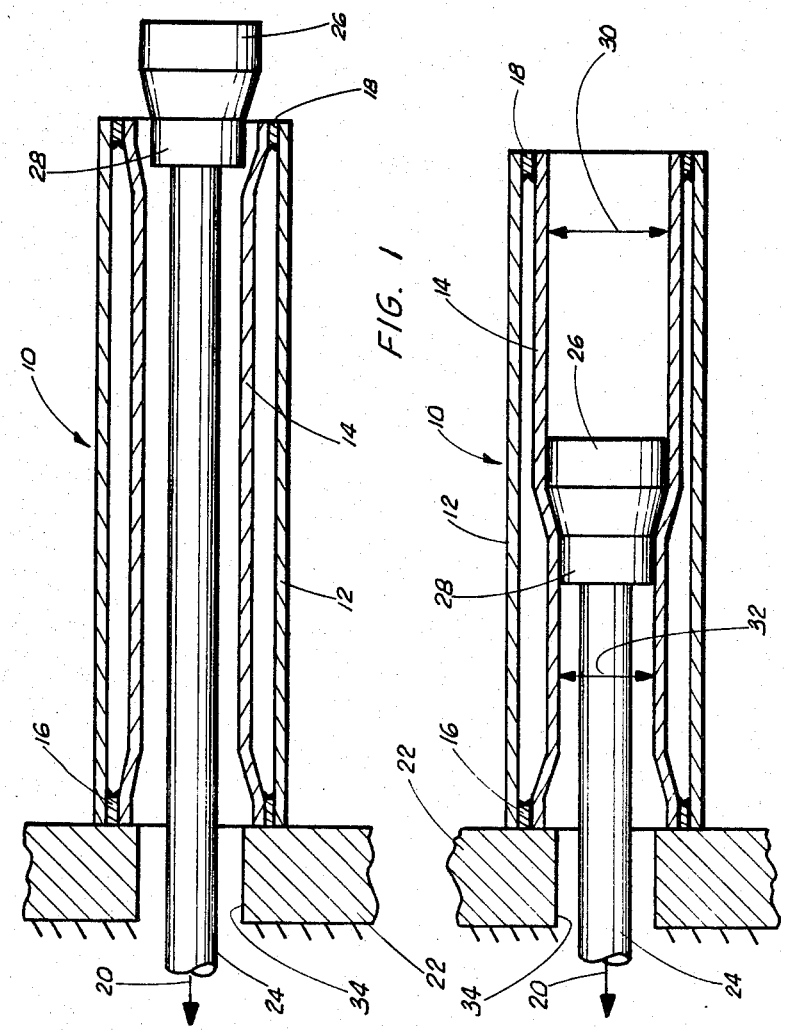

METHOD OF MECHANICALLY PRESTRESSING A TUBULAR APPARATUS

This application is a continuation-in-part of co-pending application Ser. No. 413,284, filed Aug. 31, 1982, now U.S. Pat. No. 4,470,188.

The present invention relates in general to the prestressing of elongated conduits for conveying hot or cold fluid and more particularly to a new and useful method of manufacturing and prestressing tubular apparatus having at least one inner tube and an outer tube.

Heavy oil and tar sands represent huge untapped resources of liquid hydrocarbons which will be produced in increasing quantities to help supplement declining production of conventional crude oil. These deposits must, however, be heated to reduce the oil viscosity before it will flow to the producing wells in economical quantities. The dominant method of heating is by injection of surface generated steam in either a continuous (steam flood) or intermittent (steam stimulation or "huff and puff") mode.

When steam is injected down long injection pipes or "strings", a significant amount of thermal energy is lost to the rock overburden (500 to 7000 feet) which covers the oil deposit. In the initial steam injection projects, the price of oil did not justify the prevention of this heat loss, but now with the price of oil at around $30.00 or more a barrel, insulation systems for the well injection pipe become economically justified.

Thermally insulated tubular structures having at least one inner tube and an outer tube are known and used, for example, as insulated steam injection tubing in oil wells or in pipe lines for carrying fluids at elevated temperatures. Such piping is disclosed, for example, in U.S. Pat. No. 3,574,357 to Alexandru et al and U.S. Pat. No. 3,397,745 to Owens et al.

It is common practice for such tubes to be prestressed in order to compensate for differential expansion of the inner and outer coaxial walls or tubes. Such prestressing is done, for example, by elongating the inner tube through such means as heating or mechanically stretching and then attaching the outer tube while the inner tube is in such a prestressed state. While still held in the prestressed state, any heat treatment required for the attachment is completed. After cool down from the heat treatment, the heating or mechanical stretching is removed and the tubes assume a state of tensile prestress on the inner tube and compressive prestress on the outer tube. While in service, the inner tube becomes hot and expands. This relaxes the tensile prestress before the inner tube goes into compression. In this manner, the inner tube may be prevented from buckling.

In an analogous fashion, where the inner tube is adapted to convey cold fluids, the outer tube is heated or mechanically stretched before the inner tube is connected thereto.

Disadvantages of these prior approaches to prestressing double walled tubes or conduits is that the inner, outer, or both tubes must be held in their compressed or stretched state while other manufacturing steps are accomplished such as the connection of the tubes, the heat treatment thereof, and the cool down from the heat treatment.

Accordingly, it is an object of the present invention to provide a method of prestressing such double walled tubes in which the various manufacturing steps such as connection of the tubes, heat treatment thereof, and cool down from heat treatment may be accomplished before the tubes are prestressed.

The various features of novelty which characterize this invention are pointed out with particularity in the claims annexed to and forming a part of this specification. For an understanding of the invention, its operating advantages, and specific objects attained by its use, reference should be had to the accompanying drawings and descriptive matter in which there is illustrated and described the preferred embodiments of the invention.

IN THE DRAWINGS

FIG. 1 is a side sectional view of a double walled tubular apparatus to which prestressing is to be applied according to the invention, and a mandrel in position for such prestressing;

FIG. 2 is a view similar to that of FIG. 1 illustrating the process of prestressing the double walled tubular with the mandrel.

DESCRIPTION OF THE PREFERRED EMBODIMENTS

Figure 3:
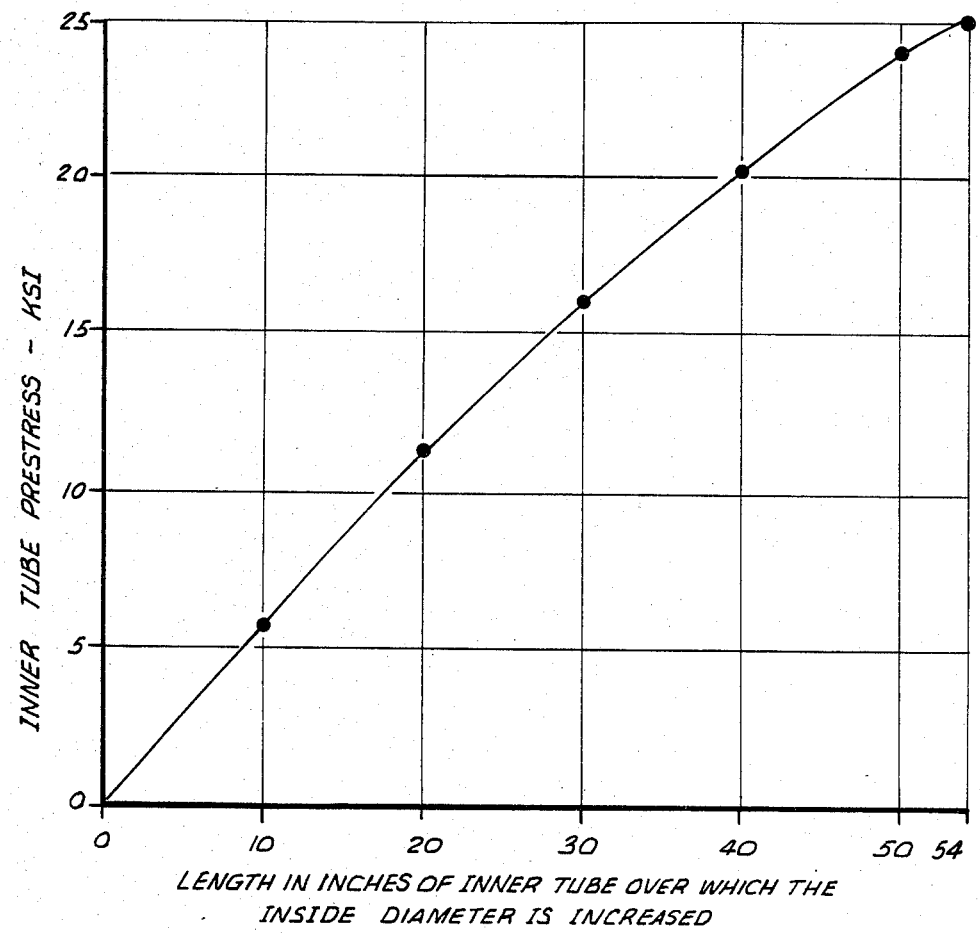
FIG. 3 is a graph illustrating the increase in prestress as the mandrel is drawn through the inner tube of the double walled tubular.

Referring to FIGS. 1 and 2, there is illustrated a method of manufacturing and prestressing a tubular apparatus which is generally designated by the numeral 10. The tubular apparatus comprises an outer wall or tube portion 12 of metal and an inner wall or tube portion 14 of metal which are coaxially disposed and spaced apart with respect to each other and fixed to each other by welded or otherwise interconnected joints 16 and 18, which joints are connected between the inner and outer tubes at spaced locations along the length therof and preferably at their ends.

Inner tube 14 is adapted to convey high temperature fluid such as steam. Double wall tube 10 can, for example, be a single length of an insulated steam injection tubing string used for extracting oil from an oil well using steam.

In accordance with the present invention, the tubular 10 is prestressed, as hereinafter described, after the inner and outer tubes 14 and 12 respectively are connected at their joints 16 and 18 to eliminate the difficulty of connecting the tubes while they are in the prestressed state and to permit heat treatment and subsequent cooling of the joint welds prior to prestressing of the tubular.

Further in accordance with the present invention, the tubular 10 is prestressed by increasing the diameter of the inner tube 14 so as to permanently shorten the inner tube whereby a tensile prestress is applied to the inner tube and a compressive prestress is applied to the outer tube.

In accordance with a preferred embodiment of the invention, the tubular 10 is prestressed by restraining the tubular 10 against movement in a first direction illustrated at 20 such as by butting an end such as the end at joint 16 against a crosshead 22 of a draw bench or the like, then pulling a bar 24 which draws a plug 26 of a mandrel 28 through the inner tube 14 in the first direction 20. The draw bench 22 is provided with aperture 34 through which bar 24 may be pulled.

The mandrel plug 26 has a diameter approximately equal to the final inner tube inside diameter 30 required for the desired amount of prestress. Since the plug diameter is thus greater than the inner tube inside diameter 32 before the application of prestress, and, since the diameter of the inner tube portions at the joints 16 and 18 cannot be increased without detriment to the joints after the welding of the joints, in accordance with this embodiment of the invention, the inner tube portion diameter at at least one of the joints (the one 18 at which the mandrel is inserted) is increased by conventional means to the final diameter 30 prior to joining the inner and outer tubes. Preferably, the diameters of the inner tube portions at both joints 16 and 18 are increased to the final diameter 30 prior to joining the tubes to provide uniform inner tube inside diameter at least at each of the ends and to prevent the portion of the tubular at a joint through which the plug is drawn from becoming deformed.

FIG. 2 illustrates the tubular apparatus 10 after the plug 26 has been drawn part way therethrough. The inner tube inside diameter is being increased from its original diameter 32 to final diameter 30 while the inner tube wall thickness is being decreased and the inner tube length is being decreased. Initially, the wall thinning and length shortening strains are approximately equal. As tension stress builds in the inner tube, the ratio of length shortening strain to wall thinning strain decreases. Thus, there will be an amount of tension stress which represents the limit at which there will be no further length shortening strain with an increase in tube diameter. This limit as well as the amount of inner tube inside diameter increase and the length over which the inside diameter is increased for a desired amount of prestress can be calculated utilizing principles of common knowledge to those of ordinary skill in the art to which this invention pertains. Thus, the amount of diameter increase of the inner tube must be selected carefully.

In accordance with an alernative embodiment of the present invention, the inner tube inside diameter may be increased by inserting plugs in each end of the inner tube preferably beyond each of the joints and applying hydrostatic pressure to the inner tube.

An example of the invention is a welded tubular assembly, as shown in FIG. 1, wherein each of the tubes is approximately 40 feet long and is comprised of a carbon steel material which has a plastic flow stress of 95 ksi (kilopounds per square inch). The outer tube has a 4.5 inch outside diameter, and a 0.271 inch wall thickness. The inner tube has a 3.5 inch outside diameter and a 0.173 inch wall thickness. A plug is drawn through about 54" of the inner tube length to give a 3 percent expansion of the inner tube. Taking into consideration the hoop and axial stresses on the assembly, this will shorten the assembly by about 0.2 inch and prestress the outer tube to about 12.58 ksi compression and the inner tube to about 25.00 ksi tension. FIG. 3 illustrates the increase in prestress of the inner tube with increased length of the inner tube over which the inside diameter is increased. The ratio of the prestresses is inversely proportional to the ratio of the cross sectional areas of the tubular walls. As the plug is pulled through the inner tube, the prestress increases at a decreasing rate. Initially, the prestress increases at a rate of about 620 psi per inch of length expanded. As the 25,000 psi prestress level is approached, the prestress increases at a rate of only about 340 psi per inch of length expanded. The inner tube prestress is limited to one-half the flow stress at which stress level the metal flow becomes plane strain axially and the expansion of the inner tube results in thinning of the wall with no decrease in inner tube length and no change in prestress level.

Concerning other features of the structure which may be used in conjunction with the invention, the annular space between the inner and outer tubes amy be advantageously insulated using fibrous or layered insulation, and/or evacuated to establish a thermal barrier. When the space is evacuated, it is advantagous to provide the space with a getter material that absorbs gases that may migrate into the space during the life of the tubular apparatus. Such getter material is for example titanium and is advantageously provided around the inner tube when the inner tube conveys steam and is at an elevated temperature of from 400° to 700° F. The getter material is activated to improve its gas absorbing function. Gases which may migrate into the annular space include hydrogen formed by corrosion of the outer tube or outgassed gases from the inner tube such as nitrogen, carbon monoxide, and oxygen.

Some features of the present invention can be used to advantage without use of other features of the invention.

While specific embodiments of the invention have been shown and described in detail to illustrate the application of the principles of the invention, it will be understood that the invention may be embodied otherwise without departing from such principles.

We claim:

1. A method of prestressing a tubular apparatus having at least one metal inner tube positioned within and spaced apart from a metal outer tube, the method comprises connecting the inner tube to the outer tube at at least two locations spaced along the length of the tubular apparatus with the walls of the inner and outer tubes spaced from each other, and then, which the tubes are connected, expanding increasing the diameter of at least a major portion of the inner tube between said locations so as to permanently shorten the inner tube whereby a tensile prestress is applied to the inner tube and a compressive prestress is applied to the outer tube with the inner and outer tubes remaining spaced from each other.

2. A method according to claim 1 wherein the step of increasing the diameter of at least a portion of the inner tube comprises drawing a mandrel at least partly through the inner tube.

3. A method according to claim 2 further comprises increasing the diameter of the inner tube to a diameter equal at least to the diameter of the mandrel at at least one of said two locations before connecting the inner tube to the outer tube at said at least one of said two locations.

4. A method according to claim 1 further comprises increasing the diameter of the inner tube at at least one of said two locations before connecting the inner tube to the outer tube at said at least one of said two locations.

* * * * *